S. J. CLULEE.
EYEGLASSES.
APPLICATION FILED AUG. 8, 1912.

1,182,349.

Patented May 9, 1916.

WITNESSES

INVENTOR
S. J. Clulee
BY
Drull, Warfield & Drull
ATTORNEYS

UNITED STATES PATENT OFFICE.

STEPHEN J. CLULEE, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASSES.

1,182,349.

Specification of Letters Patent.

Patented May 9, 1916.

Application filed August 8, 1912. Serial No. 713,952.

*To all whom it may concern:*

Be it known that I, STEPHEN J. CLULEE, a citizen of the United States, residing at Attleboro, in the county of Bristol and State of Massachusetts, have invented certain new and useful Improvements in Eyeglasses, of which the following is a full, clear, and exact description, such as will enable others skilled in the art to which it appertains to make and use the same.

This invention relates to eyeglasses, and with regard to certain more specific features thereof, to eyeglass mountings.

One of the objects of this invention is to provide a simple and practical eyeglass mounting in which the parts are securely held in assembled relation.

Another object is to provide a durable eyeglass mounting which will be inexpensive to manufacture and easy to assemble.

A further object is to provide an adjustable mounting of the character first above mentioned in which the parts when assembled will be free from relative movement and will not tend to jam or wear loose.

Another object is to provide a practical mounting of the finger-piece type in which the necessity for using screws is avoided.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
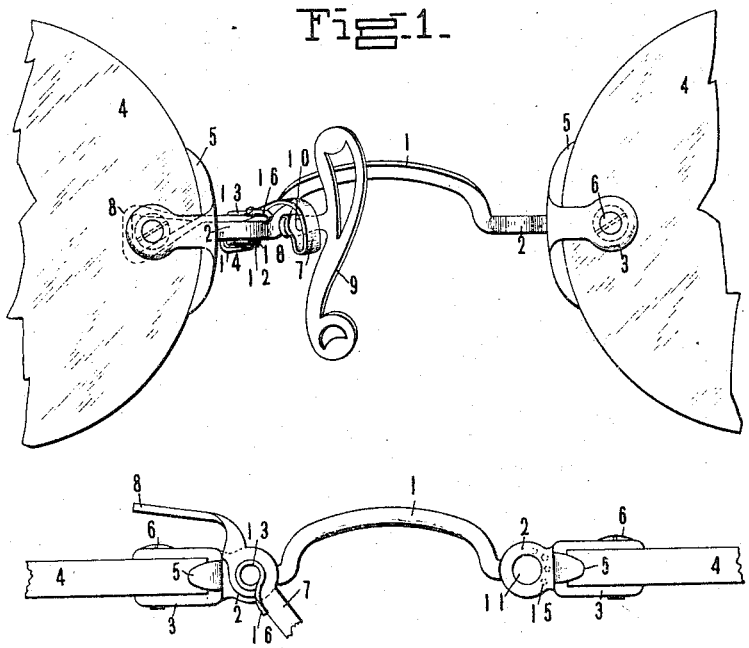
Figure 2:
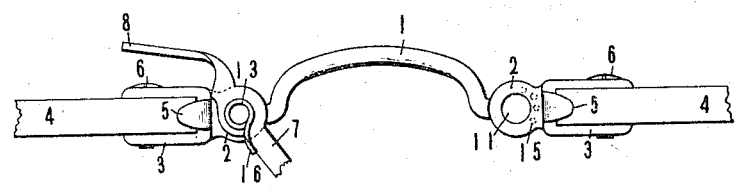
Figure 3:
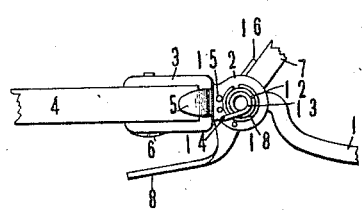
Figure 4:
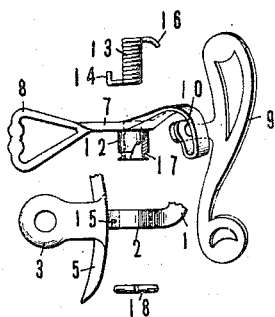

In the accompanying drawing wherein is shown one of the various possible embodiments of this invention, Figure 1 is a rear elevational view of a pair of eyeglasses with one of the guard-arms and associated parts removed; Fig. 2 is a top plan view thereof; Fig. 3 is a bottom plan view of one side of the device shown in Fig. 1, and Fig. 4 is a detailed view with the parts in disconnected relation.

Similar reference characters refer to similar parts throughout the several views of the drawing.

Referring now in detail to the drawing, 1 denotes the saddle or bridge at each end of which is positioned a bearing portion 2 and clamping lugs 3 for supporting the lenses 4. These lenses are mounted in the clamping lugs 3 in the usual manner and held against shoes 5 by means of screws 6.

Mounted and adapted to swing upon each bearing portion 2 is a guard-arm 7 provided at one end with actuating arms 8 and carrying at the opposite end a nose-guard 9 adapted to grip the side of the nose. The guards are pivotally mounted at 10 so as to permit of automatic adjustment to noses of different shape.

Each bearing portion 2 is provided with a vertically disposed cylindrical opening or hole 11 through which is adapted to pass a boss or pivot 12 integral with or secured to the guard-arms 7. This boss which is tubular in shape is of a size adapted to telescopically fit but turn freely within the hole 11 and is of a length sufficient to prevent wabbling or looseness at the connection. After passing the tubular boss 12 through the hole 11 a coiled spring 13 is passed therethrough. The lower end 14 of the spring is turned upwardly, as shown in Fig. 4, to engage one of a plurality of tapped-out holes or recesses 15 on the under side of the bearing portion whereby its tension may be readily adjusted either while assembling the parts or after the glasses have been worn for some time. The other end of the spring 16 projects laterally to engage the rear side of the guard-arm 7 and urge the same toward the center, as shown in Fig. 2, whereby the guard 9 will yieldingly engage the side of the nose. The spring 13 is always under tension regardless of the position of the guard 9, and as the actuating arms 8 are moved toward the center as when placing the glasses upon the nose, the tension of the spring will be increased; thereby tending to decrease the diameter of the coil and permit a freer turning of the telescoping parts. In other words, the coiled spring is mounted to resist the swinging of the parts in one direction by its torsional elasticity. By having the ends of the spring extending laterally to each side of its longitudinal axis, the parts will be held in assembled position by the spring and resist separation thereof by means of its longitudinal elasticity.

To further provide against any possible tendency of the parts to separate in the direction of the axis of the tubular boss 12, the lower part of the boss is provided with an annular recess 17 just below the under surface of the field-piece 2 when the parts are assembled. A split ring 18 is adapted to be slipped over the end of the boss 12 and snapped into position in this recess, thereby preventing a withdrawal of the guard-arm without first removing this spring.

It is thought that the method of operation of a device of this character should be clear from the above description and detailed discussion thereof is unnecessary. However, it may be briefly stated that when placing the glasses on the nose, the actuating arms 8 which are in front of a vertical plane passing through the lenses, are grasped between the thumb and first finger and moved toward each other, thereby separating the guards 9 a sufficient distance to engage the sides of the nose. On releasing the actuating arms the spring 13 will urge the guards firmly into gripping position. As the guards 9 are pivotally mounted upon the arms they will swing in any direction that may be necessary to conform to the peculiar shape of the nose of the wearer. If it is desired to adjust the tension of the spring the turned up end 14 is withdrawn and inserted in another hole 15 to one side or the other of its former position as desired.

It is thus seen that this invention provides a simple and practical eyeglass mounting which is inexpensive to manufacture and easy to assemble, and adapted to accomplish, among others, all of the objects and advantages above set forth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:—

1. In a device of the character described, in combination, a guard arm, a supporting member therefor, one of said parts being provided with a tubular extension and the other provided with a recess in which said extension fits and turns throughout a major portion of its length, and a separate helical spring engaging the exterior top and bottom surfaces of said parts adapted to resist separation of said arm and said supporting member in an axial direction.

2. In a device of the character described, in combination, a guard arm, a supporting member therefor, a pivot carried by said guard-arm, and a spring partially within said pivot adapted to position said arm and to lock said arm and said supporting member against separation in an axial direction.

3. In a device of the character described, in combination, a guard-arm, a supporting member therefor, one of said members having a connected part passing into and beyond a part of the other of said members and having a recess in said part, and a resilient locking member lying in said recess.

4. In a device of the character described, in combination, a supporting member having an opening therein, a guard arm, a pivot on said guard arm adapted to be inserted in said opening, and a coil spring extending within said pivot adapted to position said guard arm.

5. In a device of the character described, in combination, a guard-arm having an actuating arm at one end and a pivotally mounted guard at the other end, a supporting member therefor, said guard arm having a tubular boss passing into and beyond the support, and spring means in said boss tending to swing said guard-arm and hold said parts against separation.

6. In a device of the character described, in combination, a guard-arm having a tubular boss intermediate its ends, an actuating arm at one end and a pivotally mounted guard at the other end, a supporting member telescopically connected with said guard-arm, a coiled spring passing through said tubular part adapted to urge the guard into engagement with the side of the nose, and a resilient locking member adapted to prevent separation of the telescopically connected parts.

7. In a device of the character described, in combination, a support having a bearing portion at each end, spring actuated guard-arms mounted on said support, each having an integral tubular boss intermediate its ends adapted to turn on the upper side of said support, and a spring for each arm passing through said support.

8. In a device of the character described, in combination, a saddle having a bearing portion at each end, a guard-arm having a tubular boss intermediate its ends adapted to turn on said bearing portion, and a spring member extending through said tubular boss and resiliently urging the bearing surfaces of said parts into engagement.

9. In a device of the character described, in combination, a supporting member, a guard arm mounted to turn thereon, one of said members being provided with an opening, a hollow pivot on the other of said members adapted to be inserted in said opening, and a coil spring within, and held in alinement by, said pivot and adapted to hold said pivot in said opening and to position said guard arm.

10. In a device of the character described, in combination, a guard arm, a support, one of said before mentioned elements having a bearing opening, a tubular pivot pin integral on the other of said elements and bearing in said opening, and a spring having a portion lying in said pin and arranged to tend to cause relative movement between said arm and said support.

11. In a device of the character described, in combination, a guard arm, a support, one of said before mentioned elements having a bearing opening, a tubular pivot pin permanently fixed on the other of said elements and bearing in said opening, and a spring having a coiled portion lying in said pin and arranged to tend to cause relative movement between said arm and said support.

12. In a device of the character described, in combination, a guard arm, a support, one of said before mentioned elements having a bearing opening, a tubular pivot pin integral on the other of said elements and bearing in said opening, and a spring having a portion lying in said pin and arranged to tend to cause relative movement between said arm and said support and retain said two first mentioned elements in assembled relation.

13. In a device of the character described, in combination, a supporting member having a bearing opening, a tubular pivot pin bearing in said opening, a guard-arm carried by said pin, and a spring having a portion lying in said pin and arranged to tend to cause relative rotary movement between said arm and said support.

14. In a device of the character described, in combination, a supporting member having a bearing opening, a tubular pivot pin bearing in said opening, a guard-arm carried by said pin, and a spring having a coiled portion lying in said pin and arranged to tend to cause relative rotary movement between said arm and said support.

15. In a device of the character described, in combination, a supporting member having a bearing opening, a tubular pivot pin bearing in said opening, a guard-arm carried by said pin, a spring having a portion lying in said pin and arranged to tend to cause relative rotary movement between said arm and said support, said pivot having a recess, and a resilient member adapted to be disposed in said recess and prevent relative axial displacement of said member and said pin.

In testimony whereof I affix my signature, in the presence of two witnesses.

STEPHEN J. CLULEE.

Witnesses:
WALTER A. BRIGGS,
JOSEPH A. DONOVAN.